(12) United States Patent
Itomi

(10) Patent No.: US 6,688,006 B2
(45) Date of Patent: Feb. 10, 2004

(54) ROTATIONAL ANGLE SENSOR ASSEMBLY

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 117 days.

(21) Appl. No.: 09/835,390

(22) Filed: Apr. 17, 2001

(65) Prior Publication Data

US 2001/0034943 A1 Nov. 1, 2001

(30) Foreign Application Priority Data

Apr. 28, 2000 (JP) ........................................ 2000-130431

(51) Int. Cl.[7] ................................................. G01B 5/24
(52) U.S. Cl. ....................................... 33/1 N; 33/1 PT
(58) Field of Search .............................. 33/1 N, 1 PT, 33/534, 706, 707, 708

(56) References Cited

U.S. PATENT DOCUMENTS

| | | | | |
|---|---|---|---|---|
| 4,369,578 A | * | 1/1983 | Ernst .......................... 33/1 PT |
| 4,625,411 A | * | 12/1986 | Kashiwagi et al. ........... 33/1 N |
| 4,863,206 A | * | 9/1989 | Kaufmann ................ 294/119.4 |
| 5,311,666 A | * | 5/1994 | Jacobsen et al. .............. 33/1 N |
| 5,375,333 A | * | 12/1994 | Hecht et al. .................. 33/1 N |
| 5,657,544 A | * | 8/1997 | Ota et al. ..................... 33/1 N |
| 5,949,344 A | * | 9/1999 | Yasuda et al. ............... 33/1 PT |
| 6,239,372 B1 | * | 5/2001 | Gartner et al. ............ 174/74 R |
| 6,341,426 B1 | * | 1/2002 | Okumura ...................... 33/1 N |
| 6,445,278 B1 | * | 9/2002 | Okumura ..................... 338/162 |
| 6,467,799 B2 | * | 10/2002 | Adomeit et al. .......... 280/728.2 |
| 6,482,542 B1 | * | 11/2002 | Takaki et al. ................ 429/120 |

* cited by examiner

Primary Examiner—Diego Gutierrez
Assistant Examiner—Yaritza Guadalupe

(57) ABSTRACT

In order to minimize change in base position from which an output representative of the angle of rotation of a rotary shaft (2) relative to a housing (1) is based, to reduce the number of component parts used, to enable a load acting on the rotary shaft (2) to be supported and to enable a rotational angle sensor assembly to be assembled with a simplified machining operation, the rotational angle sensor assembly includes a rotational angle detecting means (3) for detecting the angle of rotation between mutually opposed first and second rotational angle detectors (3A) and (3B). A housing (1) is of a cup-shaped configuration having a hollow defined therein, with the first rotational angle detector (3A) disposed at the bottom of the housing hollow. The second rotational angle detector (3B) is mounted on one end of the rotary shaft (2) that is rotatably supported by rolling bearings (4). The bearings (4) are pre-loaded at a predetermined pressure by a spring member (6). A portion of the rotary shaft (2) remote from the first rotational angle detector (3A) extends outwardly from an opening (1f) of the housing (1).

5 Claims, 3 Drawing Sheets

ROTATIONAL ANGLE SENSOR ASSEMBLY

BACKGROUND OF THE INVENTION

1. Field of the Invention

The present invention generally relates to a sensor assembly for detecting the angle of rotation of elements relative to each other and, more particularly, to the rotational angle sensor assembly for use in construction machinery and industrial machinery for detecting the angle of rotation of a rotating element such as, for example, a rotary shaft or an oscillating shaft while the latter is operated under a loaded condition.

2. Description of the Prior Art

As an instrument for measuring the angle of rotation of a rotary shaft or an oscillating shaft, a rotational angle detecting potentiometer has long been used. The rotational angle detecting potentiometer includes an electroconductive brush movable together with, for example, a rotary shaft and an electric resistor held in sliding contact with the brush. The potentiometers provides a voltage signal represented by the resistance of the resistor which varies depending on the position of the electroconductive brush, so that the angle of rotation of the rotary shaft can be determined in reference to the voltage signal.

The standard rotational angle detecting potentiometer hitherto used makes use of an oil retaining metal or a relatively small rolling bearing in order to permit the rotary shaft to be rotatably supported relative to a housing and is incapable of allowing the rotary shaft to be loaded with a relatively high load. When a relatively high load is imposed on the rotary shaft in one or both of axial and radial directions thereof, a relatively large error tends to occur in the detected angle of rotation.

In order to alleviate the foregoing problem, the rotational angle sensor assembly of a structure shown in FIG. 4 has been suggested by the applicant. Referring to this figure, the rotational angle sensor assembly shown therein includes a rotary shaft 52 having a large diametric portion 52a formed therein so as to protrude radially outwardly therefrom and supported by a housing 51 through bearings 53. The housing 51 is in the form of a cap sufficient to accommodate therein both the large diametric portion 52a of the rotary shaft 52 and the bearing 53 and having an opening closed by a lid 54. The lid 54 is secured to the housing 51 by means of a plurality of set bolts 58. First and second rotational angle detecting members 56 and 57 altogether forming a rotational angle detecting means 55 are mounted on an inner surface of the lid 54 and an end face of the rotary shaft 52, respectively. One of the detecting members 56 and 57 is made up of an electric resistor and the other is made up of an electroconductive brush. The bearings 53 are positioned within the housing 51 coaxially one above the other with an annular space left therebetween. Within the annular space between the bearings 53, a flange 52b radially outwardly extending from the rotary shaft 52 is interposed between respective inner races of those bearings 53 whereas an annular spacer 59 is interposed between respective outer races of those bearings 53.

According to the structure shown in FIG. 4, since the bearings 53 are preloaded at a predetermined position and, also, since the rotary shaft 52 is formed with the large diametric portion 52a to enable the bearings 53 of a relatively large size to be employed, the rigidity with which the rotary shaft 52 is supported can increase advantageously and, even in a condition in which a load acts on the rotary shaft 52, the angle of rotation of the rotary shaft 52 relative to the housing 51 can advantageously be detected accurately and with no error occurring.

However, the rotational angle sensor assembly of the structure shown in and described with reference to FIG. 4 has the following disadvantage. Specifically, since the housing 51 and the lid 54 carrying the first rotational angle detecting member 56 including a potentiometer substrate and others are members separate from each other, any possible error in mounting the lid 54 to the housing 51 such as resulting from, for example, a play occurring between one or more set bolts 58 and associated bolt holes may brings about a detrimental displacement of the reference or base position from which an output representative of the angle of rotation of the rotary shaft 52 relative to the housing 51 is based. In other words, where the rotational angle detecting means 55 is assembled in the form of a potentiometer made up of an electric resistor and an electroconductive brush, an electrically neutral position (normally, a zero reading position of the potentiometer) relative to the housing 51 may detrimentally displace as a result of an error in mounting of the lid 54 relative to the housing 51. In addition, the employment of the lid 54 brings about the necessity to use, other than the lid 54, the set bolts 58 and an O-ring seal 60 to be interposed between the lid 54 and the housing 51, resulting in increase of the number of component parts.

Also, in order for the bearings 53 to be set in position under a pre-loaded condition, the annular spacer 59 and/or the flange 52b between the two bearings 53 must have a thickness carefully designed to be consistent with the size of the bearings and do thus require a precise machining accuracy, resulting in increase of the cost of manufacture.

SUMMARY OF THE INVENTION

In view of the foregoing, the present invention is intended to provide an improved rotational angle sensor assembly effective to minimize variation of the reference or base position from which the output representative of the angle of rotation of, for example, the rotary shaft relative to the housing, to reduce the number of component parts employed and also to effectively and sufficiently support the load acting on the rotary shaft.

Another important object of the present invention is to provide an improved rotational angle sensor assembly of the type referred to above, which does not substantially require a precise machining accuracy in mounting the bearings under a pre-loaded condition and which can be easily and inexpensively assembled using a simplified machining.

In order to accomplish these objects of the present invention, there is provided a rotational angle sensor assembly which includes a generally cup-shaped housing having an opening leading into a hollow defined therein, a rotary shaft having first and second ends opposite to each other, and a rotational angle detecting means including first and second rotational angle detectors and operable to detect the angle of rotation between the first and second rotational angle detectors. The first rotational angle detector is disposed at a bottom of the hollow of the housing. The second rotational angle detector being mounted on the first end of the rotary shaft within the hollow of the housing. A first portion of the rotary shaft adjacent the second end thereof extends outwardly from the opening of the housing. A bearing means is accommodated within the hollow of the housing under a pre-loaded condition for rotatably supporting the rotary shaft.

According to the present invention, the angle of rotation of the rotary shaft relative to the housing is detected in terms of the angle of rotation between the first and second rotary angle detectors provided in and on the housing and the rotary shaft, respectively. Since the housing is of a generally cup-shaped structure with the first rotational angle detector disposed directly at the bottom of the hollow of the housing, unlike the conventional design in which a rotational angle detector is mounted on a lid which is in turn secured to a housing, the present invention is advantageous in that no variation in output indicative of the angle of rotation due to an error in mounting will occur which would otherwise result from a mounting error. Also, the housing is of a solid one-piece structure, not only is the need to use any lid eliminated, but the need to use any bolts otherwise necessary to secure the lid to the conventional housing and any sealing member otherwise necessary to be interposed between the lid and the conventional housing are also eliminated, thereby reducing the number of component parts advantageously.

Also, since the bearing means is pre-loaded as hereinbefore described, the rotary shaft is substantially free from any rattling motion during rotation thereof and the angle of rotation can be accurately detected even under a loaded operating condition.

In a preferred embodiment of the present invention, a spring member may be employed for applying a pre-load to the bearing.

The use of the spring members is effective to apply a proper pre-load to the bearing means so that the latter can be pre-loaded at a predetermined pressure, without requiring any stringent dimensional accuracy such as required where a bearing is pre-loaded at a predefined position. For this reason, the need to highly accurately machine the housing, a shaft flange and/or a spacer is advantageously eliminated to thereby allow the rotational angle sensor assembly to be manufactured inexpensively with a simplified machining procedure.

In the practice of the present invention, the rotary shaft may have a portion stepped to provide a large diametric portion at one end thereof where the bearing means supports the rotary shaft rotatably, having a diameter greater than that of the remaining portion of the rotary shaft.

Where that portion of the rotary shaft that is supported by the bearing means is represented by the large diametric portion of the rotary shaft, the bearing means of a relatively large size can be employed. The use of the bearing means of a relatively large size is effective in that even though a load acting on the rotary shaft is relatively high, the bearing means can support such high load and therefore, an accurate detection of the angle of rotation is possible even when the rotary shaft is loaded by the high load.

Preferably, the bearing means includes first and second bearings having inner and outer races with a plurality of rolling elements interposed therebetween. These first and second bearings are positioned within the hollow of the housing one above the other in a direction parallel to the rotary shaft, with the first bearing positioned adjacent the opening of the hollow of the housing. In such case, a stop ring is used to secure the outer race of the first bearing to the housing. In this design, the spring member for applying a predetermined pre-load to the bearing means is interposed between a bottom face of the hollow of the housing and the outer race of the second bearing adjacent the bottom face of the hollow of the housing or, alternatively, between the stop ring and the outer race of the first bearing adjacent the stop ring. Also, a sealing member may be used to fill up an annular space between an inner peripheral surface of the housing adjacent the opening and an outer peripheral surface of the rotary shaft.

The use of the two bearings in combination with the spring member is effective to accomplish the pre-loading with a predetermined pressure.

Also in a preferred embodiment of the present invention, one of the first and second rotational angle detectors includes an electric resistor and the other of the first and second rotational angle detectors includes a slide brush, so that the rotational angle detecting means can serve as a potentiometer.

Where the rotational angle detecting means is in the form of a potentiometer, the base position from which an output representative of the angle of rotation of the rotary shaft relative to the housing is based may be considered an electrically neutral position. With respect to this electrically neutral position relative to the housing, the rotational angle sensor assembly such as that the design in which the rotational angle detector is provided in the generally cup-shaped solid one-piece housing is substantially free from dimensional variation among the component parts thereof as compared with the rotational angle detector is provided on the lid that is separate from the housing. Although the rotational angle detecting means in the form of a potentiometer is simple in structure, any possible change in a biasing force used to urge the slide brush so as to keep the slide brush in sliding contact with the resistor and/or the electroconductive element would eventually result in an error in measurement of the angle of rotation of the rotary shaft. However, according to the present invention, since the bearing means is pre-loaded, the biasing force applied to the slide brush can be stabilized even though a load acting on the rotary shaft is relatively high, allowing a precise detection of the angle of rotation to be achieved advantageously.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
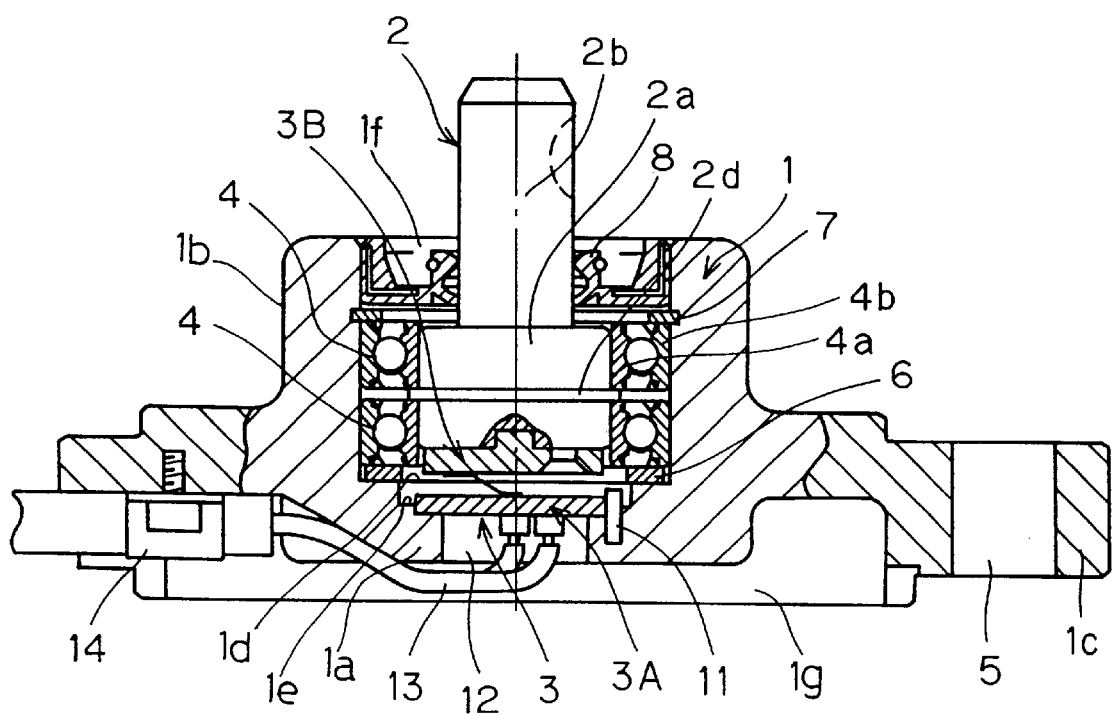
FIG. 1 is a longitudinal sectional view of a rotational angle sensor assembly according to a preferred embodiment of the present invention.

A rotational angle sensor assembly according to a preferred embodiment of the present invention will now be described with reference to FIGS. 1 to 3. The rotational angle sensor assembly includes, as shown in FIG. 1, a housing 1 of a cup-like configuration having a bottom wall 1a and a tubular side wall 1b and opening upwardly at 1f.

The illustrated rotational angle sensor assembly also includes a rotational angle detecting means 3 made up of a first rotational angle detector 3A, disposed at the bottom of a cylindrical hollow of the housing 1, and a second rotational angle detector 3B mounted on one end of a rotary shaft 2 within the housing 1. The rotary shaft 2 is rotatably supported by upper (first) and lower (second) bearings 4 and 4 that are press-fitted into the cylindrical hollow of the housing 1 with a portion 2b on the side of the opposite end thereof protruding outwardly from the opening 1f of the housing 1. As shown in FIG. 2, the housing 1 has a plurality of mounting tongues 1c protruding radially outwardly from the tubular side wall 1b at respective locations adjacent the bottom of the housing 1. Each of the mounting tongues 1c has a mounting hole 5 defined therein for passage of mounting bolts (not shown).

Figure 2:
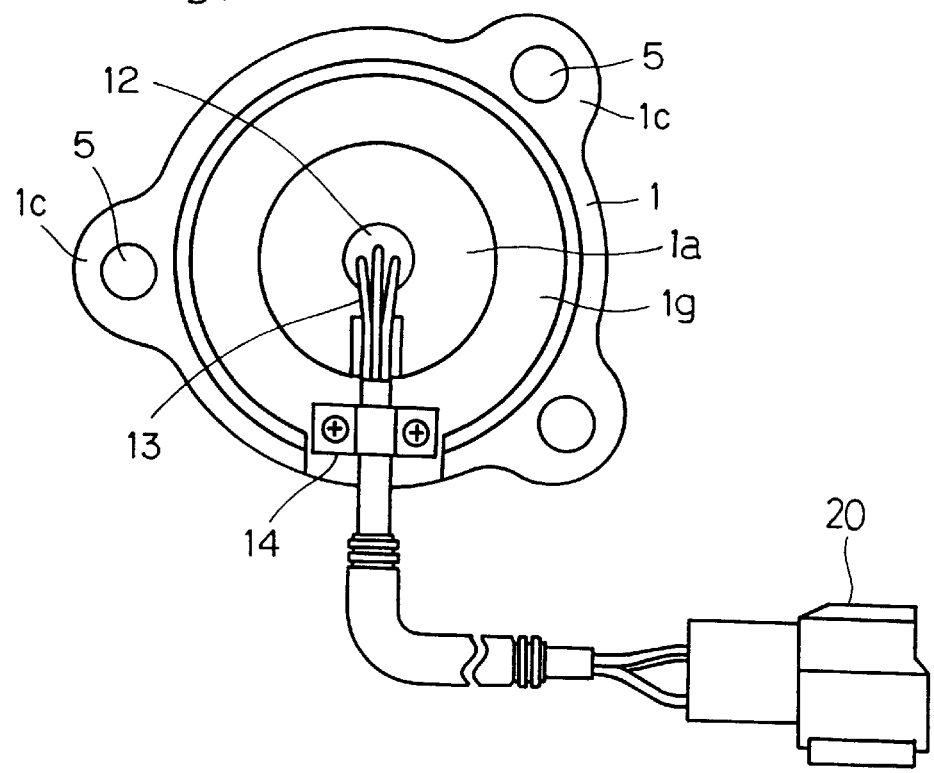
FIG. 2 is a bottom plan view of the rotational angle sensor assembly shown in FIG. 1.

As shown in FIG. 1, that end of the rotary shaft 2 within the cylindrical hollow of the housing 1 is so stepped as to have a large diametric portion 2a of a diameter larger than the remaining portion of the rotary shaft 2 including the outwardly protruding end 2b. The upper and lower bearings 4 and 4 are positioned within the cylindrical hollow of the housing 1 coaxially one above the other with an annular space left therebetween. Each of these upper and lower bearings 4 and 4 is in the form of a rolling bearing such as, for example, a deep groove ball bearing, of a type preferably provided with a seal and includes an inner race 4a, an outer race 4b and a plurality of rolling elements, i.e., balls retained by any known retainer in a row. The inner race 4a of each bearing 4 is fitted on the rotary shaft 2, particularly the large diametric portion 2a thereof while the outer race 4b of the respective bearing 4 is fitted on an inner peripheral surface of the tubular side wall 1b of the housing 1.

An annular pre-loading spring member 6 such as, for example, a wavy washer is interposed between a bottom face 1d of the cylindrical hollow of the housing 1, which represents an annular shape by the reason which will become clear from the subsequent description, and the outer race 4b of the lower bearing 4 adjacent the bottom face 1d. On the other hand, a stop ring 7 is disposed within the cylindrical hollow of the housing 1 in engagement with the outer race 4b of the upper bearing 4 adjacent the opening 1f with its outer peripheral portion received within an annular groove defined in the inner peripheral surface of the tubular side wall 1b. The stop ring 7 so disposed serves to prevent the upper and lower bearings 4 and 4 from being axially displaced out of the housing 1 through the opening 1f. Thus, a pair of the bearings 4 are installed in the housing 1. The annular space left between inner races 4a and 4a of the respective upper and lower bearings 4 and 4 is occupied by an annular flange formed integrally with the large diametric portion 2a of the rotary shaft 2 so as to extend radially outwardly therefrom.

Thus, the annular pre-loading spring member 6, the annular flange 2d and the stop ring 7 cooperate with each other to bring the upper and lower bearings 4 and 4 under a pre-loaded condition to rotatably support the rotary shaft 2. It is to be noted that an annular space between an upper portion of the inner peripheral surface of the tubular side wall 1b adjacent the opening 1f of the housing 1 and a corresponding portion of the rotary shaft 2 is closed by a seal member 8. Specifically, the seal member 8 is preferably comprised of an oil seal or the like and is mounted on the inner peripheral surface of the housing 1 with a generally tubular lip region thereof held in sliding contact with an outer peripheral surface of the rotary shaft 2.

The rotational angle detecting means 3 is in the form of a potentiometer. The first rotational angle detector 3A includes an electric resistor formed, or otherwise deposited, on a carrier substrate that is disposed at the bottom of the cylindrical hollow of the housing 1. More specifically, the bottom of the cylindrical hollow of the housing 1 is depressed to define a coaxial cavity 1e while leaving the annular bottom face 1d, with the first rotational angle detector 3A resting fixedly within the coaxial cavity 1e. The pre-loading spring member 6 is disposed on the annular bottom face 1d. The resistor carrier substrate of the first rotational angle detector 3A is positioned relative to the housing 1 by means of a positioning pin 11 protruding from the bottom wall 1a of the housing 1 into the coaxial cavity 1e while the annular pre-loading spring member 6 is sandwiched between the outer race 4b of the lower bearing 4 and the annular bottom face 1d as hereinbefore described.

The bottom wall 1a of the housing 1 is formed with a lead-out hole 12 in alignment with a longitudinal axis of the cylindrical hollow of the housing 1, and a plurality of lead lines 13 electrically connected with the electric resistor on the carrier substrate of the first rotational angle detector 3A are drawn outwardly from the carrier substrate through the lead-out hole 12. Specifically, the lead lines 13 extend within a shallow depression 1g, formed in an outer bottom surface of the housing 1, in a direction generally radially of the housing 1 and are, after having been bundled together within the shallow depression 1g, retained in position by a line retainer 14 secured to the outer bottom surface of the housing 1 as clearly shown in FIG. 2.

The second rotational angle detector 3B shown in FIG. 1 includes an electroconductive slide brush mounted on a carrier substrate and held in sliding contact with the first rotary angle detector 3A, particularly the electric resistor as will be described in more detail later. This second rotational angle detector 3B has its carrier substrate fixedly secured to an end face of the large diametric portion 2a of the rotary shaft 2 by means of set screws or the like.

Figure 3:
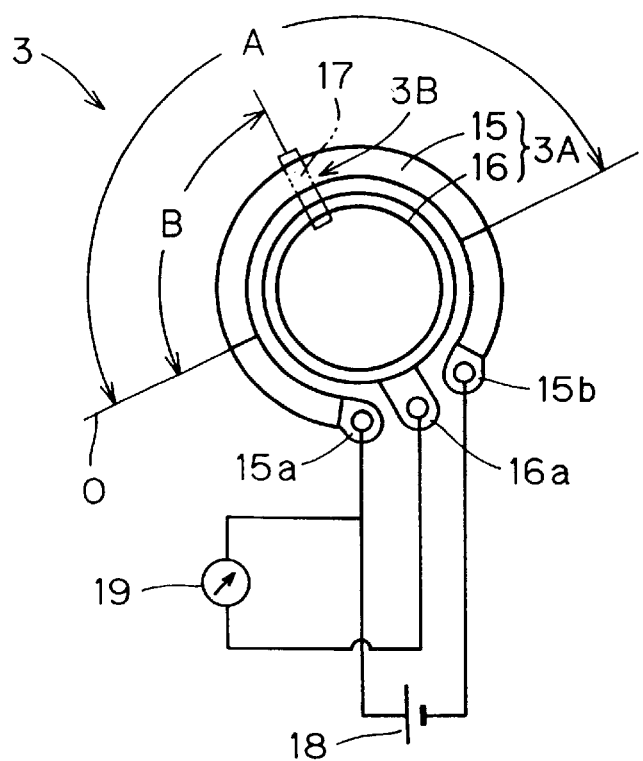
FIG. 3 is a schematic bottom plan view showing a rotational angle detecting means and an exemplary circuit structure employed in the rotational angle sensor assembly shown in FIG. 1.

FIG. 3 illustrates an exemplary circuit arrangement employed in the rotational angle sensor assembly applicable where the rotational angle detecting means 3 is employed in the form of a potentiometer. The first rotational angle detector 3A includes an electric resistor 15 of a generally split-ring configuration made of, for example, an electroconductive resin and extending coaxial with the rotary shaft 2 and a ring-shaped electroconductive element 16 positioned coaxially with and radially inwardly of the resistor 15. The second rotational angle detector 3B includes an electroconductive slide brush 17 held in sliding contact with the resistor 15 at one end thereof and also with the electroconductive element 16 at the opposite end thereof so as to electrically connect the elements 15 and 16 together.

The resistor 15 has its opposite ends connected respectively to terminals 15a and 15b that are connected with a direct current power source 18 with a predetermined voltage consequently applied between the terminals 15a and 15b thereof. A voltmeter 19 is interposed between the terminal 15a of the resistor 15 and a common terminal 16a connected with the electroconductive element 16, whereby a voltage between the terminals 15a and 16a that is divided out of the voltage applied between the opposite terminals 15a, 15b of the resistor 15 can be detected by the voltmeter 19. Accordingly, the position of the slide brush 17 and, hence, the angle of rotation B of the rotary shaft 2 from the base position O can be determined in terms of the voltage detected by the voltmeter 19. It is to be noted that the maximum angle of rotation of the rotary shaft 2 that can be detected by the rotational angle sensor assembly of the present invention is 180° about the longitudinal axis of the rotary shaft 2 so far shown in connection with the illustrated embodiment, but may be more or less than 180°. It is also to be noted that the direct current power source and the voltmeter 19 referred to above are housed within a unit box 20 shown in FIG. 2.

With the rotational angle sensor assembly constructed in the manner described hereinabove, the housing 1 is of a cup-like configuration with the first rotational angle detector 3A disposed at the bottom of the cylindrical hollow thereof. Accordingly, unlike the design in which a rotational angle detector is mounted on a lid which is in turn secured to a housing 1, the present invention is advantageous in that no variation in output indicative of the angle of rotation will occur which would otherwise result from a mounting error. Where the rotational angle detecting means 3 is employed in the form of a potentiometer including the electric resistor 15 and the electroconductive slide brush 17, the base position from which an output representative of the angle of rotation of the rotary shaft relative to the housing is based may be considered an electrically neutral position. With respect to this electrically neutral position relative to the housing 1, the rotational angle sensor assembly such as that according to the preferred embodiment of the present invention in which the rotational angle detector 3A is provided in the generally cup-shaped solid one-piece housing 1 is substantially free from variation among the component parts thereof as compared with the rotational angle detector provided on the lid that is separate from the housing 1.

Figure 4:
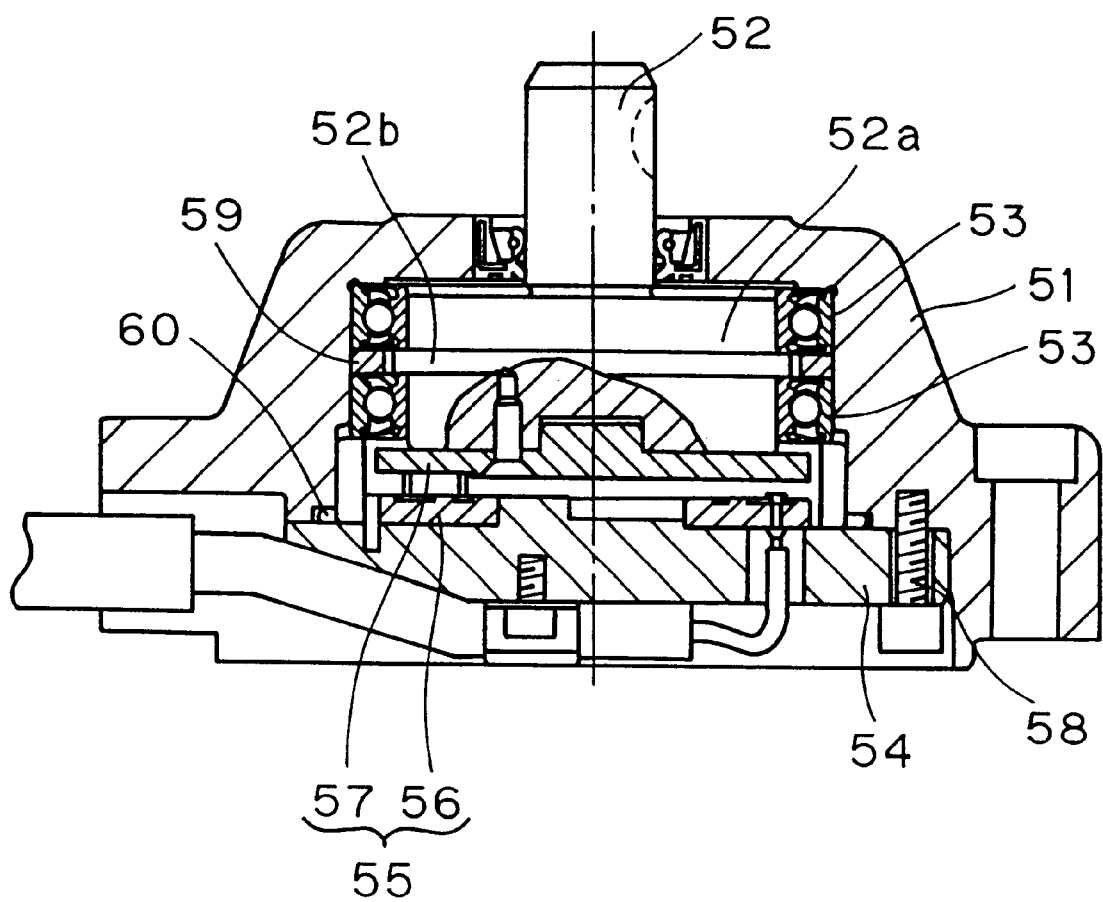
FIG. 4 is a longitudinal sectional view of the prior art rotational angle sensor assembly.

Also, since in the rotational angle sensor assembly the housing 1 is of a solid one-piece structure, not only is the need to use any lid eliminated, but the need to use any bolts otherwise necessary to secure the lid to the conventional housing and any sealing member otherwise necessary to be interposed between the lid and the conventional housing are also eliminated, thereby reducing the number of component parts advantageously. By way of example, while the conventional rotational angle sensor assembly shown in FIG. 4 requires seventeen types of component parts totaling to 24 parts, the rotational angle sensor assembly according to the illustrated embodiment merely requires twelve types of component parts totaling to 13 parts and, thus, substantially half of the total number of the component parts required in the conventional rotational angle sensor assembly shown in FIG. 4.

Also, since in the rotational angle sensor assembly of the present invention the use is made of the large diametric portion 2a on the rotary shaft 2, a rolling bearing of a relatively large size can be used for each of the upper and lower bearings 4 and, accordingly, even though a relatively large load acts on the rotary shaft 2, the bearings 4 can effectively support the large load on the rotary shaft 2. Since the bearings 4 are pre-loaded as hereinbefore described, the rotary shaft 2 is substantially free from any raffling motion during rotation thereof and the angle of rotation can be accurately detected even under a loaded operating condition. Since preloading of the bearings 4 is effected to such an extent that a predetermined pressure can be applied to the bearings 4 by the provision of the spring member, no substantially dimensional accuracy such as required where bearings are pre-loaded at a predefined position is required, allowing a properly predetermined pressure to be applied to the bearings. For this reason, the housing 1, the annular flange 2d rigid or integral with the rotary shaft 2 and/or the annular spacer need not be highly precisely machined and, therefore, the rotational angle sensor assembly of the present invention can be manufactured inexpensively with a simplified machining procedure.

Although the rotational angle detecting means 3 in the form of a potentiometer is simple in structure, any possible change in a biasing force used to urge the slide brush 17 so as to keep the slide brush 17 in sliding contact with the resistor 15 would eventually result in an error in measurement of the angle of rotation of the rotary shaft. However, according to the present invention, since the bearings 4 are pre-loaded, the biasing force applied to the slide brush 17 can be stabilized, allowing a precise detection of the angle of rotation to be achieved advantageously.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, the spring member 6 which has been shown and described as interposed between the annular bottom face 1d of the cylindrical hollow of the housing 1 and the outer race 4b of the lower bearing 4 may be interposed between the stop ring 7 and the outer race 4b of the upper bearing 4, in which case the outer race 4b of the lower bearing 4 is held in abutment with the annular bottom face 1d of the cylindrical hollow of the housing 1.

Also, the first and second rotational angle detectors 3A and 3B may be reversed in position relative to each other. Specifically, the first rotational angle detector 3A may be mounted on one end of a rotary shaft 2 within the housing 1 and the second rotational angle detector 3B is then disposed at the bottom of the cylindrical hollow of the housing 1.

Accordingly, such changes and modifications are, unless they depart from the scope of the present invention as delivered from the claims annexed hereto, to be construed as included therein.

What is claimed is:

1. A device for detecting an angle of rotation comprising:
   a rotational angle detecting device including first and second rotational angle detectors and operable to detect the angle of rotation between the first and second rotational angle detectors;
   a generally cup-shaped housing having an opening leading into a hollow defined therein, wherein the housing is a one-piece structure having a bottom wall and a side wall, said first rotational angle detector being disposed at the bottom wall of the housing,
   a rotary shaft having first and second ends opposite to each other, said second rotational angle detector being mounted on the first end of the rotary shaft within the hollow of the housing, a first portion of the rotary shaft adjacent the second end extending outwardly from the opening of the housing; and
   at least one bearing accommodated within the hollow of the housing under a pre-loaded condition for rotatably supporting the rotary shaft;
   a discrete stop ring; and
   a sealing member;
   wherein the at least one bearing includes first and second bearings positioned within the hollow of the housing one above the other in a direction parallel to the rotary shaft, each of the first and second bearings having outer and inner races with a plurality of rolling elements interposed therebetween, the first bearing being positioned adjacent the opening of the hollow of the housing; and wherein said stop ring is positioned between the outer race of the first bearing and the seal member, and is used to secure the outer race of the first bearing to the housing, and said sealing member is used to fill up an annular space between an inner peripheral surface of the housing adjacent the opening and an outer peripheral surface of the rotary shaft.

2. The device for detecting the angle of rotation as claimed in claim 1, further comprising a spring member for applying a pre-load to the at least one bearing.

3. The device for detecting the angle of rotation as claimed in claim 1, wherein a second portion of the rotary shaft that is supported by the at least one bearing is a large diametric portion of the rotary shaft which has a diameter greater than that of the first portion of the rotary shaft.

4. The device for detecting the angle of rotation as claimed in claim 1,
wherein a spring member for applying a predetermined pre-load to the bearing means is interposed between the bottom wall of the hollow of the housing and the outer race of the second bearing adjacent the bottom wall of the hollow of the housing or between the stop ring and the outer race of the first bearing adjacent the stop ring.

5. The device for detecting the angle of rotation as claimed in claim 1, wherein one of the first and second rotational angle detectors includes an electric resistor and the other of the first and second rotational angle detectors includes a slide brush.

* * * * *